(12) United States Patent
Katieb

(10) Patent No.: US 9,635,005 B2
(45) Date of Patent: Apr. 25, 2017

(54) COMPUTER READABLE STORAGE MEDIA FOR TIERED CONNECTION POOLING AND METHODS AND SYSTEMS FOR UTILIZING SAME

(71) Applicant: Document Storage Systems, Inc., Juno Beach, FL (US)

(72) Inventor: Ralph Katieb, Minneapolis, MN (US)

(73) Assignee: DOCUMENT STORAGE SYSTEMS, INC., Juno Beach, FL (US)

(*) Notice: Subject to any disclaimer, the term of this patent is extended or adjusted under 35 U.S.C. 154(b) by 173 days.

(21) Appl. No.: 14/334,972

(22) Filed: Jul. 18, 2014

(65) Prior Publication Data

US 2016/0021112 A1    Jan. 21, 2016

(51) Int. Cl.
*H04L 29/06* (2006.01)
*G06F 17/30* (2006.01)

(52) U.S. Cl.
CPC .............. *H04L 63/08* (2013.01); *H04L 29/06* (2013.01); *G06F 17/30* (2013.01); *H04L 63/10* (2013.01)

(58) Field of Classification Search
CPC ................................. H04L 29/06; G06F 17/30
See application file for complete search history.

(56) References Cited

U.S. PATENT DOCUMENTS

| | | | |
|---|---|---|---|
| 7,194,761 B1 * | 3/2007 | Champagne | G06F 21/31 709/232 |
| 8,484,242 B1 * | 7/2013 | Singh | G06F 17/30442 707/770 |
| 2010/0169377 A1 | 7/2010 | Galeazzi et al. | |
| 2011/0161506 A1 | 6/2011 | Dickerson | |
| 2012/0166483 A1 | 6/2012 | Choudhary et al. | |
| 2013/0159287 A1 | 6/2013 | Barsness et al. | |

OTHER PUBLICATIONS

The International Search Report and Written Opinion dated Nov. 5, 2015 in connection with International Application No. PCT/US2015/040849.

* cited by examiner

*Primary Examiner* — Anthony Brown
*Assistant Examiner* — Samuel Ambaye
(74) *Attorney, Agent, or Firm* — Dorsey & Whitney LLP

(57) ABSTRACT

Systems and methods for tiered connection pooling are disclosed herein. An example system may include a memory encoded with computer executable instructions that when executed cause a processing unit to receive a request to access a resource; determine whether a used authenticated connection is available; if the used authenticated connection is available, fulfill the request using the used authenticated connection; if the used authenticated connection is not available, determine whether a first unused authenticated connection is available; if the first unused authenticated connection is available, fulfill the request use the first unused authenticated connection; if the first unused authenticated connection is not available, determine whether a first unauthenticated connection is available; if the first unauthenticated connection is not available, establish a second unauthenticated connection with the resource; authenticate the second unauthenticated connection to provide a second unused authenticated connection; and fulfill the request using the second unused authenticated connection.

18 Claims, 5 Drawing Sheets

COMPUTER READABLE STORAGE MEDIA FOR TIERED CONNECTION POOLING AND METHODS AND SYSTEMS FOR UTILIZING SAME

TECHNICAL FIELD

Embodiments of the present disclosure relate generally to connection pooling, and more specifically to tiered connection pooling.

BACKGROUND

In typical enterprise systems, an enterprise server connects to a back-end resource, such as an application, data server, or service provider, in response to a request from a device of a user. In many instances, the back-end resource requires authentication in order to fulfill the request, and the request may be queued or ignored until authentication has been completed. Briefly, requiring authentication prior to fulfilling requests may incur substantial unwanted delay. Such delays may be exacerbated for requests fulfilled using multiple back-end resources as authentication must be completed with each individual back-end resource.

DETAILED DESCRIPTION

Systems and methods for tiered connection pooling are disclosed herein. Certain details are set forth below to provide a sufficient understanding of embodiments of the disclosure. However, embodiments of the disclosure may be practiced without these particular details. Moreover, the particular embodiments are provided by way of example and should not be construed as limiting. In other instances, well-known circuits, control signals, timing protocols, and software operations have not been shown in detail to avoid unnecessarily obscuring the invention.

Disclosed embodiments generally relate to authentication. Briefly, authentication includes verifying an identity of a user of a device and in response, granting access to one or more resources, such as an application or database. Authentication may be performed using a number of authentication types. The first, and most common type of authentication, is directed to authenticating based on known information. This may include authenticating using credentials, such as a username, password, and/or authentication key. The second type of authentication is directed to authenticating using something possessed, such as a credit card, debit card, or smart card. The third type of authentication is directed to authenticating using characteristics, such as a location or a biometric characteristic (e.g., fingerprint). In some instances, authentication may be implemented using multi-factor authentication. In most systems, multi-factor authentication requires satisfaction of at least two of the three proffered authentication types.

Embodiments of the present disclosure further generally relate to requests. Typically, a user may provide a request to an enterprise server, which may in turn fulfill the request on behalf of the user by providing a request to a resource. By way of example, a user may request data from the enterprise server, and in turn, the enterprise server may provide one or more requests to a resource to retrieve the data from the resource. In response, the resource may provide the data to the enterprise server, which may in turn provide the data to the user.

Figure 1:
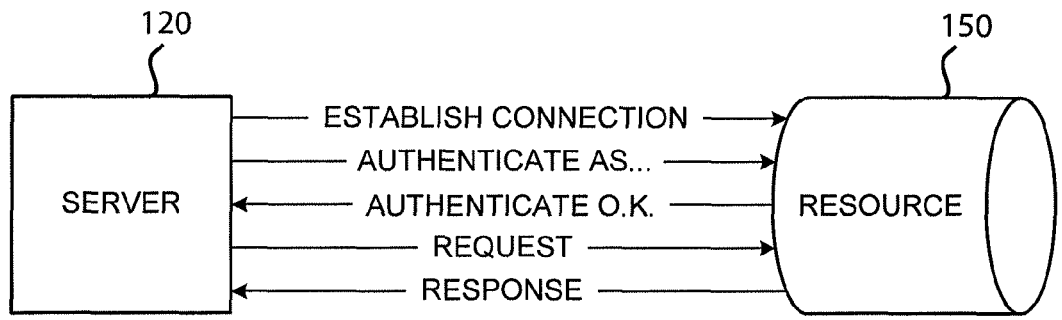
FIGS. 1-3 are schematic diagrams of back-end computing environments according to embodiments of the present disclosure.

With reference to FIG. 1, in many cases, a resource 150 may require authentication prior to fulfilling requests provided by the enterprise server 120. Accordingly, the enterprise server 120 may authenticate with the resource 150 to acquire access to the resource 150. The enterprise server may authenticate with the resource 150 on behalf of a user (e.g., using credentials associated with the user) and/or may otherwise authenticate with the resource 150. Requests provided prior to authentication may be queued or ignored by the resource 150. Once authenticated, the enterprise server 120 may provide a request and the resource 150 may fulfill the request in response, as described.

Figure 2:
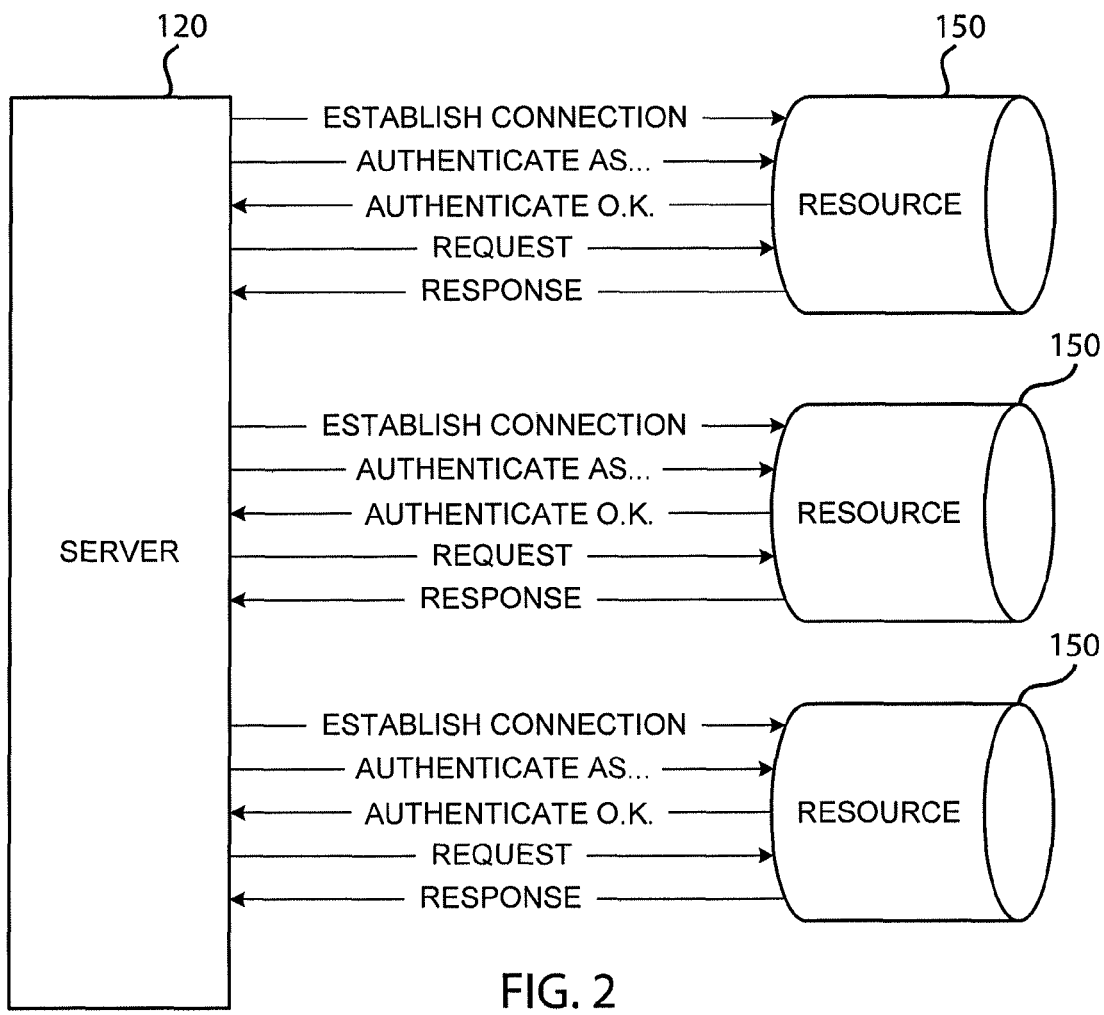

In many cases, a request provided by a user may require that an enterprise server provide multiple requests to a resource and/or provide requests to multiple resources. By way of example, with reference to FIG. 2, in response to a request for data from a user, an enterprise server 120 may establish connections with each of a plurality of resources 150 such that the enterprise server 120 may authenticate with and retrieve data from each of the resources 150.

Figure 3:
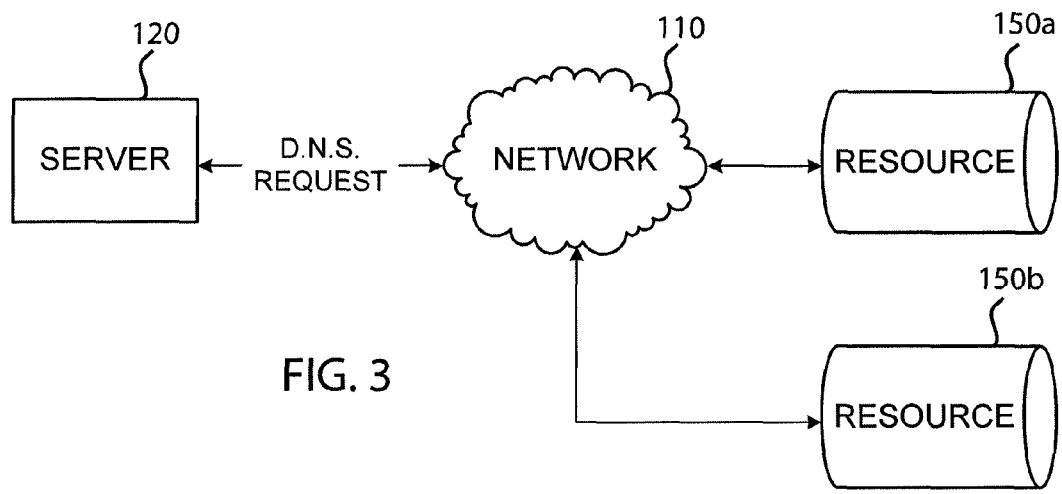

In some examples, an enterprise server may fail to establish a connection with a particular resource and may instead establish a connection with a secondary or backup resource as part of a connection failover. With reference to FIG. 3, an enterprise server 120 may attempt to establish a connection with a resource 150*a* over a network 110. In the event that the connection fails, for instance due to a timeout of the resource 150*a* and/or failure of the network 110, the enterprise server 120 may instead establish a connection with the resource 150*b*. Because the resource 150*b* may serve as a secondary or backup resource to the resource 150*a*, any request intended for the resource 150*a* may instead be fulfilled by the resource 150*b*. Moreover, because secondary and backup resources often operate using a ready-only backup/shadow function, connection failovers performed in this manner are typically software-routed by the enterprise server 120.

Accordingly, description of the operation of enterprise servers has been made herein, where, in response to requests received from users, enterprise servers may establish connections and/or authenticate with one or more resources and may further perform a connection failover in the event that a resource is not available. In some examples, however, operating in this manner may be inefficient. As an example, establishing a connection and/or authenticating with a resource in response to a request may result in delaying the time at which a request is fulfilled. In particular, authentication processes may incur delays including but not limited to establishing encrypted communication and validating credentials. Performing software-routed failovers may incur delays due to the delay of an enterprise server establishing a connection and/or authenticating with a secondary resource. Thus, as will be described below, in some examples, an enterprise server may establish a connection and/or authenticate with one or more resources prior to receiving a request. In this manner, requests may be fulfilled more efficiently.

Embodiments of the present disclosure further generally relate to connection pooling. Connection pooling includes maintaining a plurality of connections between an enterprise server and a resource such that the connections may be reused as requests associated with the resource are received and fulfilled. In this manner, the need to establish and terminate connections in response to each request may be mitigated. The plurality of connections may be maintained as a "pool" of connections and in response to each request, a connection from the pool may be utilized to fulfill the request. Once the request is fulfilled, the connection may be returned to the pool. In the event that all connections of a connection pool are assigned to respective requests, a new connection may be created to fulfill a request, or the request may be queued until a connection becomes available. Once established, new connections may be maintained in the connection pool, or may be terminated, for instance, if a limit on the number of permitted connections in the connection pool is enforced. In some instances, a server may maintain a connection pool for each of a plurality of resources. Connection pooling implemented in this manner may be implemented in accordance with programming (e.g., automatable) connectivity configurations.

Figure 4:
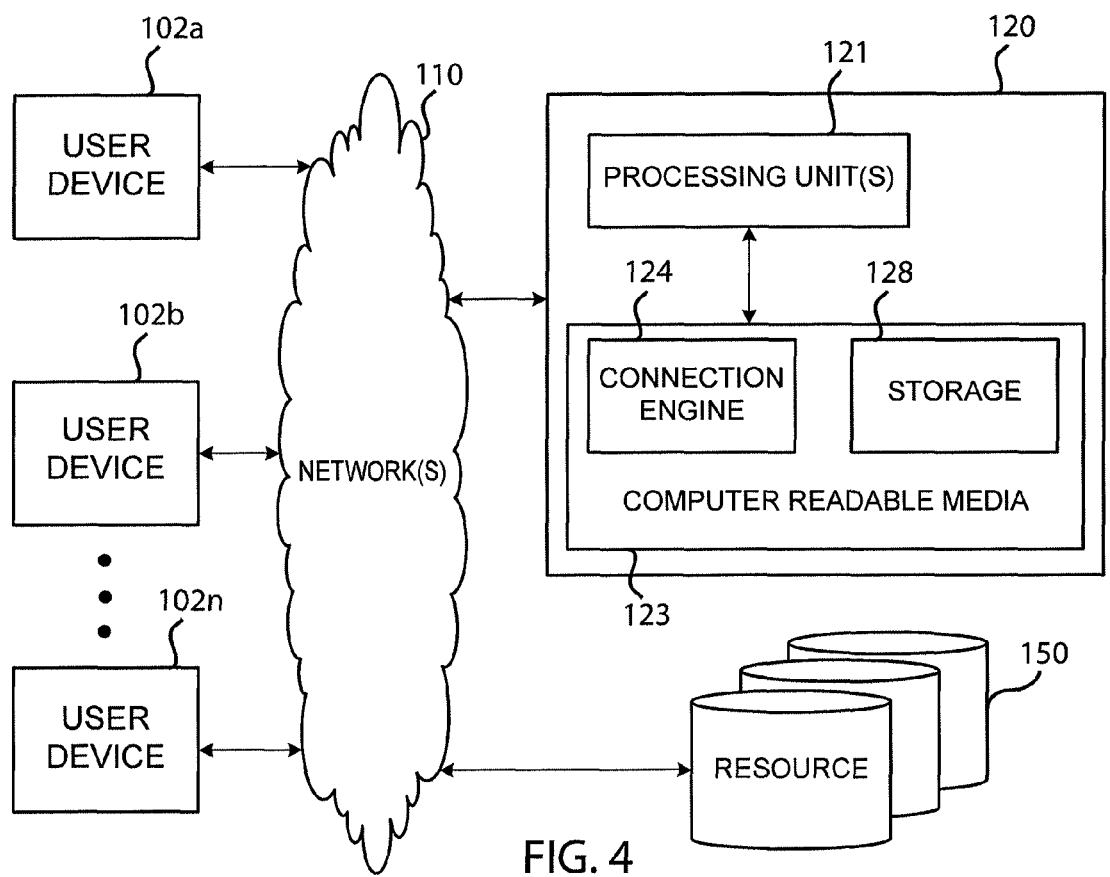
FIG. 4 is a schematic diagram of a tiered connection pooling environment according to an embodiment of the present disclosure.

FIG. 4 illustrates a computer networking environment or system 100 employing authentication and tiered connection pooling according to an embodiment of the invention. Each of the plurality of user devices 102 may comprise a computing device, including but not limited to a modem, a router, a gateway, a server, a thin client, a laptop, a desktop, a computer, a tablet, a media device, a smart phone, a cellular phone or other mobile device, or any combination or sub-combination of the same. Each of the plurality of user devices 102 may include a memory (not shown in FIG. 4) encoded with executable instructions that may operate in conjunction with one or more processing units (not shown in FIG. 4) of the user device 102. The one or more processing units may provide functionality allowing execution of executable instructions encoded on the memory of the user device 102. Each user device 102 may include instructions for execution of one or more applications that may provide requests to the enterprise server 120, described below. Providing requests in this manner may, for instance, include requesting data stored on one or more resources 150.

Each of the user devices 102 may be configured to communicate over a network 110 with any number of devices, including but not limited to the enterprise server 120 described herein. The network 110 may comprise one or more networks, such as local area networks (LANs), wide area networks (WANs), metropolitan area networks (MANs), cellular networks, and/or the Internet. Communications provided to, from, and within the network 110 may wired and/or wireless, and further may be provided by any networking devices known in the art, now or in the future. Devices communicating over the network 110 may communicate with any communication protocol, including TCP/IP and UDP protocols. Moreover, user devices 102 may be configured to communicate using known protocols such as HTTP, HTTPS, SSL, or any protocol derived therefrom.

The enterprise server 120 may include one or more processing units 121 and computer readable media 123. Herein, the term computer readable media is used to refer to a single computer readable medium in some embodiments, and in other embodiments multiple computer readable media in communication with one or more processing units, such as the processing units 121. The computer readable media 123 may store executable instructions for an enterprise engine 124. The computer readable media 123 may also include a storage 128. The executable instructions for the enterprise engine 124 may include instructions for selectively assigning one or more tiered connections to users, further examples of which are provided below. Although the executable instructions for the enterprise engine 124 are shown on a same computer readable media 123, in some embodiments any or all sets of instructions may be provided on multiple computer readable media and may not be resident on the same media. Accordingly, computer readable media 123 as used herein includes one or more computer readable media 123 and/or the storage 128. Computer readable media 123 and/or storage 128 may include any form of computer readable storage or computer readable memory, transitory or non-transitory, including but not limited to, externally or internally attached hard disk drives, solid-state storage (such as NAND flash or NOR flash media), tiered storage solutions, storage area networks, network attached storage, and/or optical storage. As described, the instructions stored on the computer readable media 123 may be executed on the one or more processing units 121 or other processing units. The executable instructions for the enterprise engine 124 may be referred to as a "connection engine" herein, where the connection engine refers to the executable instructions for an enterprise engine 124 executed by the one or more of the processing units 121 and/or other processing units.

Each of the resources 150 may be an application, a database, and/or any other service that may be used to fulfill a request. Each of the resources 150 may communicate with the enterprise server 120 and/or one or more user devices 102 over the network 110, and may communicate using any protocol known in the art, including TCP/IP, UDP, HTTP, HTTPS, SSL, any protocol derived therefrom, or any combination or sub-combination of the same. In other instances, the resources 150 may communicate with the enterprise server 120 using other communication methodologies known in the art, now or in the future.

In some examples, the connection engine may employ connection pooling and serve as an intermediary between the user devices 102 and each of the resources 150. Accordingly, the connection engine may maintain an L1 connection pool for each of the resources 150, as described. Connections maintained in this manner may be unauthenticated connections, or L1 connections, and may be used to fulfill requests provided by the user devices 102 and directed to resources 150 not requiring authentication.

In some instances, one or more resources 150 may require authentication prior to fulfilling one or more requests. Accordingly, the connection engine may authenticate users of user devices 102. In response to authenticating a user, the connection engine may assign one or more tiered connections to the user device 102. Connections assigned in this manner may be authenticated connections and may be used to fulfill requests with resources 150 requiring authentication. The connection engine may provide (e.g., generate) an authenticated connection, for instance, by removing an L1 connection from an L1 connection pool and authenticating the L1 connection with a resource 150. As described, connections may be authenticated using credentials provided by user devices 102 and/or may be authenticated in any other manner.

In some examples, an authenticated connection may either be an unused authenticated connection or a used authenticated connection. An unused authenticated connection, or L2 connection, may be an authenticated connection that has not yet been used to fulfill any requests provided by a user device 102. A used authenticated connection, or L3 connection, may be an authenticated connection that has previously been used to fulfill one or more requests provided by a user device 102. Because prior fulfillment of a request may allow for subsequent requests to be fulfilled more efficiently, L3 connections may result in more efficient fulfillment of requests than L2 requests. By way of example, data associated with a previously fulfilled request data may be buffered and therefore more readily available to fulfill a subsequent request. In some examples, for each authenticated user, the connection engine may maintain one or more L2 connections in an L2 connection pool and may maintain one or more L3 connections in an L3 connection pool.

Figure 5:
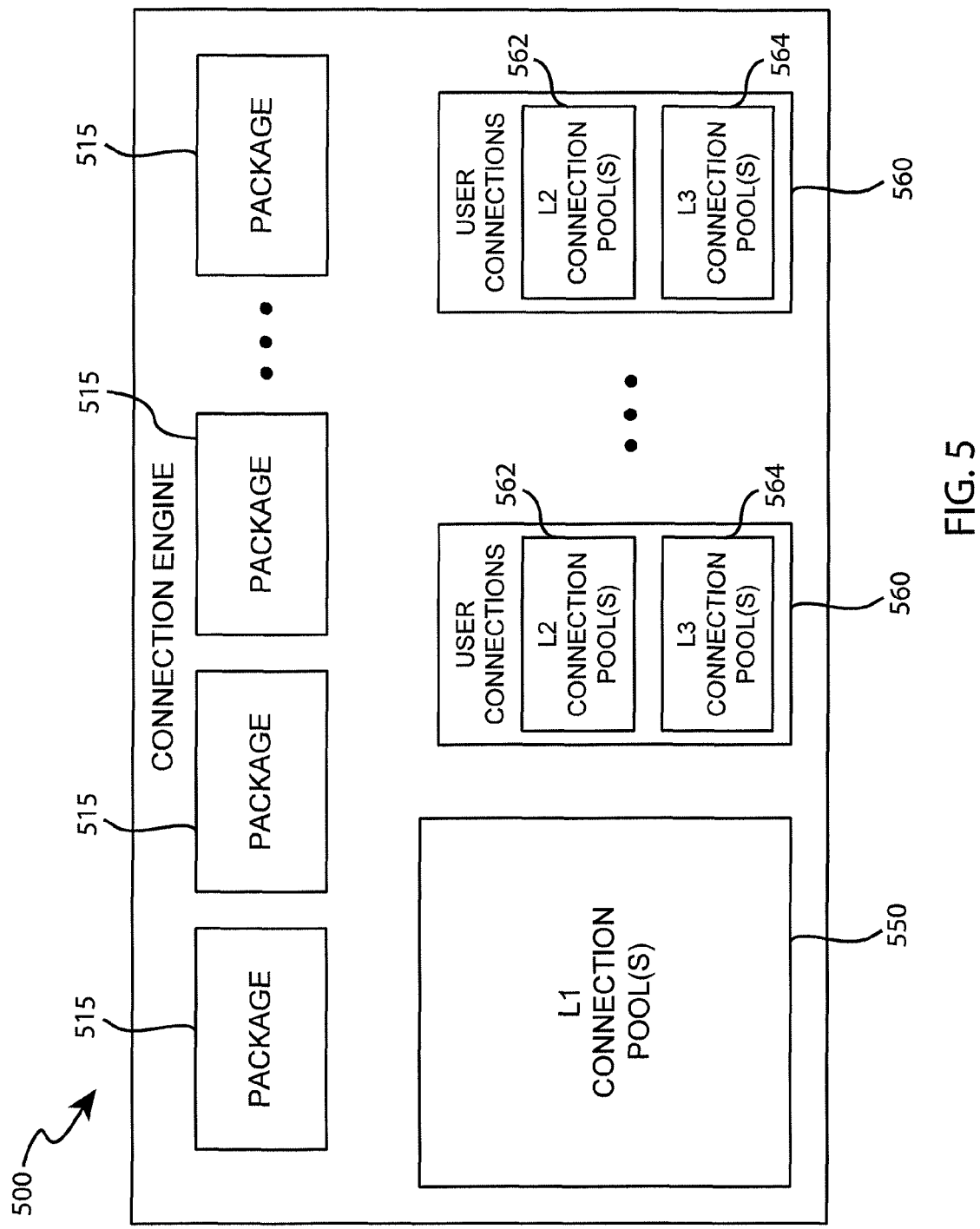
FIG. 5 is a schematic block diagram of an enterprise engine according to an embodiment of the present disclosure.

FIG. 5 is a schematic block diagram of an enterprise engine 500 according to an embodiment of the present invention. The enterprise engine 500 may be used to implement the enterprise engine 124 of FIG. 4. The enterprise engine 500 may include a plurality of packages 515, one or more L1 connection pools 550, and a plurality of user connection pools 560. Each of the user connection pools 560 may include one or more L2 connection pools 562 and/or one or more L3 connection pools 564. Each connection pool 550, 562, 564 may include any number of respective connections.

Each of the packages 515 may be a respective set of instructions for receiving and fulfilling various requests provided by one or more user devices 102. During execution, each package 515 may fulfill a respective type of request and/or two or more packages 515 may fulfill a same type of request. By way of example, a first package 515 may receive and fulfill requests for data associated with a particular database while a second package 515 may receive and fulfill requests for accessing one or more particular applications.

Briefly, in response to various requests from user devices 102, the packages 515 may utilize connections of L1 connection pools 550, L2 connection pools 562, and/or L3 connection pools 564 to provide requests to various resources 150. As described in further detail below, L1 connections of L1 connection pools 550 may be used to fulfill requests not requiring authentication, and each L1 connection pool 550 may be associated with a particular resource 150. Conversely, L2 connections of L2 connection pools 562 and L3 connections of L3 connection pools 564 of user connection pools 560 may be used to fulfill requests requiring authentication. Each user authenticated with the connection engine may have one or more respective L2 and L3 connection pools 562, 564. In particular, a user may have an L2 connection pool 562 and/or an L3 connection pool 564 for each resource 150 a user may access upon authentication of the user. In this manner, the connection engine may maintain authenticated connections for each authenticated user with any number of resources 150 requiring authentication.

Figure 6:
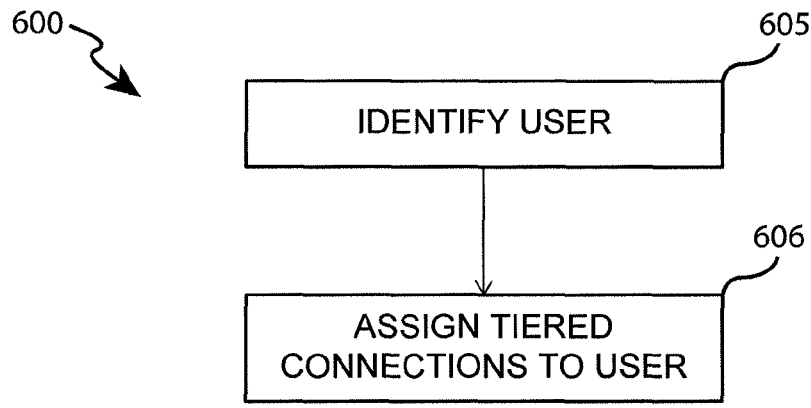
FIG. 6 is a flow chart of a method for providing tiered connections according to an embodiment of the present disclosure.

FIG. 6 is a flow chart of a method 600 for providing tiered connections according to an embodiment of the present invention. The method 600 may be implemented using the enterprise server 120 of FIG. 1, and in particular, may be implemented using the connection engine of the enterprise server 120.

At a step 605, the connection engine may identify a user. As described, identifying a user may include authenticating the user in accordance with one or more authentication methodologies such that the identity of the user may be verified. Identifying a user further may include determining which resources 150 a user may access once authenticated. The connection engine may, for instance, determine that a user may access particular data of a database. As an example, a user may be a patient of a healthcare provider and access data (e.g., healthcare data) associated with the user in a database managed by the healthcare provider. As another example, a user may be a physician, and may be authorized to access healthcare data associated with one or more of the physician's patients in a database managed by the healthcare provider.

Once the user has been identified at the step 605, the connection engine may assign one or more tiered connections to the user at a step 606. For example, if, at the step 605, the connection engine determined that the user may access a resource 150 requiring authentication, the connection engine may remove an L1 connection from the connection pool associated with the resource 150 and authenticate the L1 connection (e.g., using credentials of the user) to provide an L2 connection that may subsequently be used to fulfill requests provided by the user and directed to the resource 150. Any number of connections may be assigned in this manner for any number of resources 150 requiring authentication. A user may, for instance, be assigned three (3) L2 connections for accessing a first resource 150 and be assigned six (6) L2 connections for accessing a second resource 150.

Figure 7:
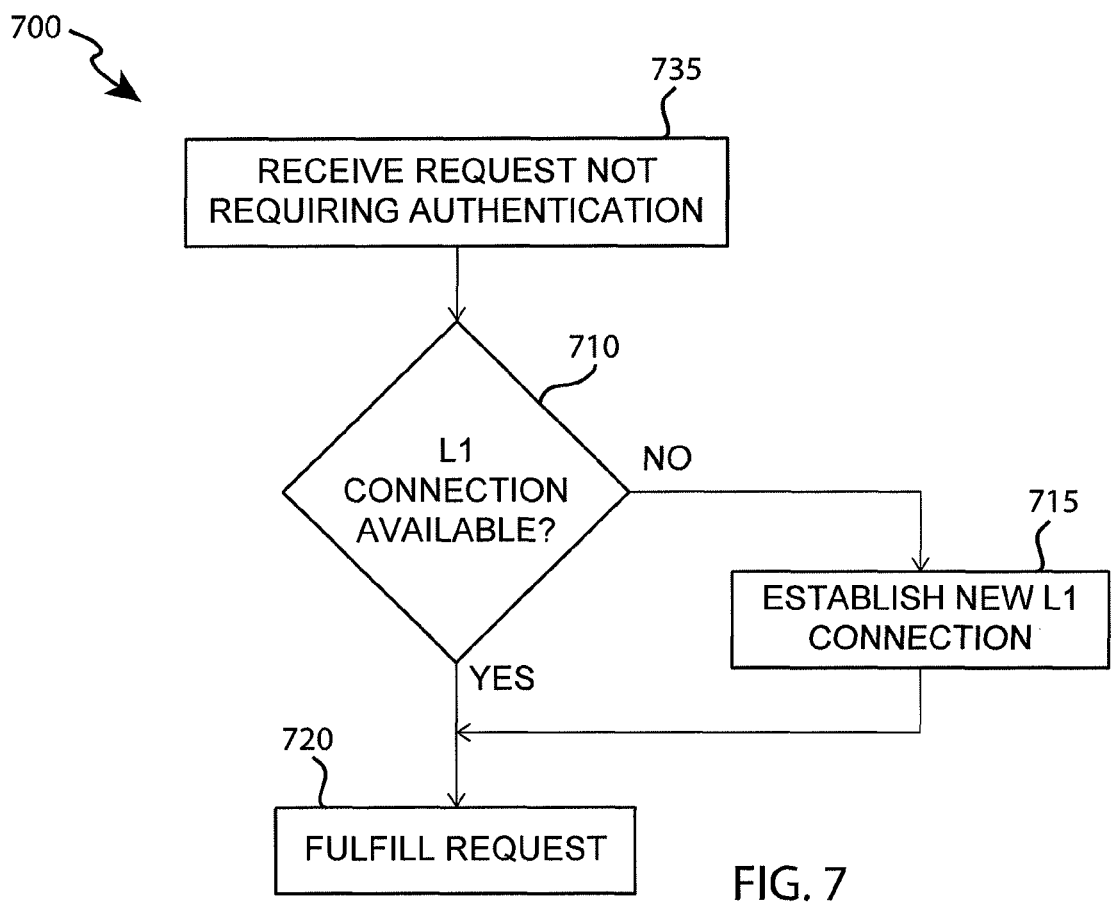
FIG. 7 is a flow chart of a method for managing connections with a resource not requiring authentication according to an embodiment of the present disclosure.

FIG. 7 is a flow chart of a method 700 for managing connections with a resource not requiring authentication according to one embodiment. The method 700 may be implemented using the enterprise server 120 of FIG. 1, and in particular, may be implemented using the connection engine of the enterprise server 120.

At a step 705, the connection engine may receive a request from a user device 102 for accessing a particular resource 150. The request may be an unauthenticated request, or a request directed to a resource 150 not requiring authentication for the request to be fulfilled. Because the request does not require authentication, at a step 710, the connection engine may determine whether any L1 connections from the connection pool associated with the requested resource 150 are available. That is, the connection engine may determine if any L1 connections established between the enterprise server 120 and the requested resource 150 are currently not being used to fulfill other requests. If an L1 connection established with the resource 150 is available, the connection engine may use the L1 connection to fulfill the request provided by the user device 102 at a step 720. If no L1 connection established with the resource 150 is available, the connection engine may establish (e.g., generate) a new L1 connection with the resource 150, and use the L1 connection to fulfill the request at the step 720.

As described, once the request has been fulfilled, the L1 connection used to fulfill the request may be returned to the connection pool associated with the resource 150 and used to fulfill future requests directed to the same resource 150. In other examples, if an L1 connection was established to fulfill the request, the L1 connection may be terminated instead of being added to the connection pool. In yet other examples, the L1 connection may be migrated to an L2 or and L3 connection pool, for instance, based on analysis of service requests from the user.

Figure 8:
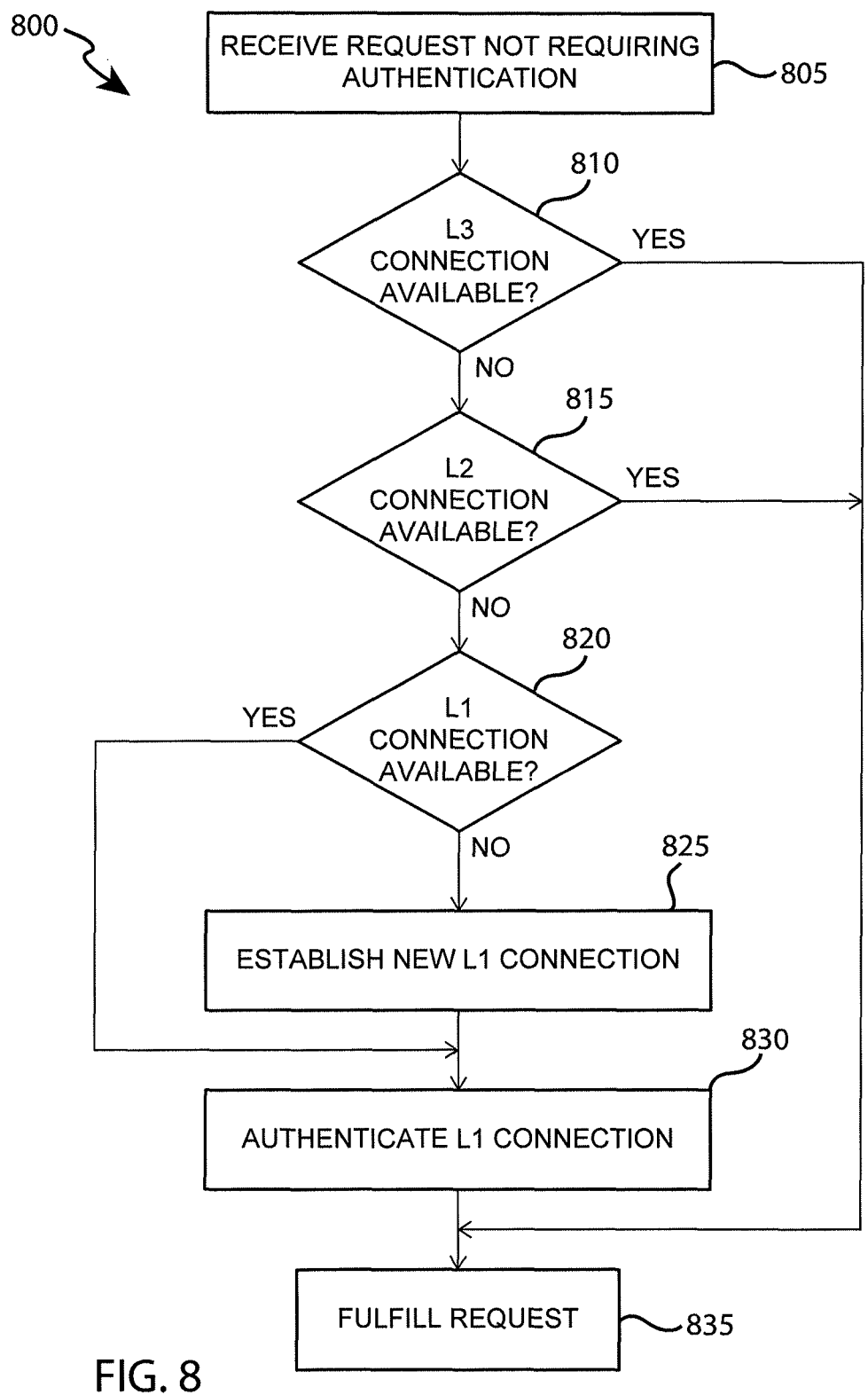
FIG. 8 is a flow chart of a method for managing connections with a resource requiring authentication according to an embodiment of the present disclosure.

FIG. 8 is a flow chart of a method 800 for managing connections with a resource requiring authentication according to an embodiment of the present invention. The method 800 may be implemented using the enterprise server 120 of FIG. 1, and in particular, may be implemented using the connection engine of the enterprise server 120.

At a step 805, the connection engine may receive a request from a user device 102 for accessing a particular resource 150. The request may be an authenticated request, or a request directed to a resource 150 requiring authentication for the request to be fulfilled. Because the request requires authentication, the connection engine may determine whether any authenticated connections associated with the requested resource 150 and assigned to the user of the user device 102 are available. For example, at a step 810, the connection engine may determine if an L3 connection assigned to the user of the user device 102 for the requested resource 150 is available. If an L3 connection is available, at a step 835, the connection engine 835 may use the available L3 connection to fulfill the request. If an L3 connection is not available, the connection engine may determine whether an L2 connection assigned to the user of the user device 102 for the requested resource 150 is available at a step 815. If an L2 connection is available, at the step 835, the connection engine may use the available L2 connection to fulfill the request.

If an L2 connection is not available, the connection engine may determine whether any L1 connections from the connection pool associated with the requested resource 150 are available at a step 820. If an L1 connection is available, the connection engine may authenticate the L1 connection at a step 830 to provide an L2 connection, and fulfill the request using the L2 connection at the step 835. If no L1 connection established with the resource 150 is available at the step 820, the connection engine may establish a new L1 connection with the resource 150 at a step 825. The connection engine may then authenticate the L1 connection to provide an L2 connection, and use L2 connection to fulfill the request at steps 830 and 835, respectively.

In some examples, if an L3 connection was not available at the step 810, once the request has been fulfilled, the connection ultimately used to fulfill the request may be assigned to the user of the user device 102 as an L3 connection and added to an L3 connection pool of the user and associated with the resource 150. In this manner, the L3 connection may be used to fulfill future authenticated requests from the same user device 102 for the same resource 150.

While the methods 700 and 800 has been described as including particular steps, it will be appreciated that in some instances additional steps may be included the methods 700, 800 and/or one or more described steps of the methods 700, 800 may be modified or omitted. By way of example, as described, the connection engine may determine whether an L3 connection is available at step 810 and may determine whether an L2 connection is available at step 815. In some instances, the connection engine may not differentiate between L2 and L3 connections such that the connection engine may determine whether either an L2 or an L3 connection is available at the step 810 and omit the step 815. As another example, with reference to the method 700, in response to determining that no L1 connection is available, the connection engine may determine whether any L2 or L3 connections are available prior to establishing a new connection. If so, the connection engine may use the available L2 or L3 connection to fulfill an unauthenticated request. In this manner, the connection engine may further reduce a need to establish one or more new connections to fulfill requests.

While examples have been described herein with respect to a user having access to a resource 150 responsive to authentication, it will be appreciated that in some instances, a user may have partial access to a resource 150 responsive to authentication. For example, a user may be authenticated such that the user may access only particular data stored on a resource 150 or utilize particular features of an application executing on a resource 150.

Further, while examples have been described herein with respect to the connection engine maintaining various connection pools with various resources 150, in some examples, resources 150 may maintain respective connection pools for communicating with the connection engine. In this manner, a resource 150 may determine the number and/or type of connections established between the resource 150 and the connection engine.

Accordingly, the connection engine may employ self-tending processes to manage a self-tending connection pool. That is, the connection engine may establish and/or terminate L1, L2, and/or L3 connections as needed to fulfill various requests provided by user devices 102. In doing so, the connection engine may enforce a limit on a number of allowed L1, L2, and/or L3 connections. Limits enforced in this manner may include a global limit, or a limit on a number of overall connections, and one or more other limits, including limits on a number of each type of connection (e.g., L1, L2, or L3) and/or a limit on a number of connections established with any particular resource 150. Moreover, connections managed in this manner may be stateful such that the connections are designated as conforming to one or more conditions. Each connection may, for instance, be designated as an L1, L2, or L3 connection and may operate according to such designation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer hardware system comprising at least one processing unit coupled to a memory, wherein the memory is encoded with computer executable instructions that when executed cause the at least one processing unit to: receive a request from a user device to access a resource, the resource requiring authentication for access; determine whether a previously used authenticated connection is available, wherein a previously used connection is a connection that has previously been used to fulfill a request provided by the user device enabling data associated with the previously fulfilled request to be buffered and more readily available to fulfill a subsequent request; if the previously used authenticated connection is available, fulfill the request using the previously used authenticated connection; if the previously used authenticated connection is not available, determine whether a first unused authenticated connection is available; if the first unused authenticated connection is available, fulfill the request using the first unused authenticated connection; if the first unused authenticated connection is not available, determine whether a first unauthenticated connection is available; if the first unauthenticated connection is not available, establish a second unauthenticated connection with the resource; authenticate the second unauthenticated connection to provide a second unused authenticated connection; and fulfill the request using the second unused authenticated connection.

2. The system of claim 1, wherein the resource comprises a database.

3. The system of claim 1, wherein the instructions further cause the at least one processing unit to:
assign a plurality of unused authenticated connections to the user device, the plurality of unused authenticated connections including the first unused authenticated connection.

4. The system of claim 1, wherein the instructions that when executed cause the at least one processing unit to authenticate the second unauthenticated connection to provide a second unused authenticated connection include instructions that when executed cause the at least one processing unit to:
remove the second unauthenticated connection from a connection pool associated with the resource.

5. The system of claim 1, wherein the instructions further include instructions that when executed cause the at least one processing unit to:
authenticate a user associated with the user device.

6. A computer hardware system comprising at least one processing unit coupled to a memory, wherein the memory is encoded with computer executable instructions that when executed cause the at least one processing unit to: receive a request from a user device to access a resource, the resource requiring authentication for access; determine whether an authenticated connection of a first type is available, wherein the authenticated connection of the first type is a previously used authenticated connection, and wherein a previously used connection is a connection that has previously been used to fulfill a request provided by the user device enabling data associated with the previously fulfilled request to be buffered and more readily available to fulfill a subsequent request;
if the authenticated connection of the first type is available, fulfill the request using the authenticated connection of the first type; if the authenticated connection of the first type is not available, determine whether a first authenticated connection of a second type is available; if the first authenticated connection of the second type is available, fulfill the request using the authenticated connection of the second type; if the first authenticated connection of the second type is not available, authenticate an unauthenticated connection to provide a second authenticated connection of the second type; and fulfill the request using the second authenticated connection of the second type.

7. The system of claim 6, wherein the instructions further cause the at least one processing unit to:
assign a plurality of authenticated connections of the second type to the user device.

8. The system of claim 6, wherein the authenticated connection of the second type is an unused authenticated connection.

9. The system of claim 6, wherein the resource comprises a database.

10. The system of claim 6, wherein the instructions that when executed cause the at least one processing unit to determine whether an authenticated connection of a first type is available include instructions that when executed cause the at least one processing unit to:
determine whether the unauthenticated connection is available; and
if the unauthenticated connection is not available, establish the unauthenticated connection with a resource.

11. The system of claim 6, wherein the instructions that when executed cause the at least one processing unit to authenticate an unauthenticated connection to provide a second authenticated connection of the second type include instructions that when executed cause the at least one processing unit to:
remove the unauthenticated connection from a connection pool associated with the resource.

12. The system of claim 6, wherein the instructions further include instructions that when executed cause the at least one processing unit to:
authenticate a user associated with the user device.

13. The system of claim 6, wherein the instructions that when executed cause the at least one processing unit to fulfill the request using the second authenticated connection of the second type include instructions that when executed cause the at least one processing unit to:
designate the second authenticated connection of the second type as an authenticated connection of the first type.

14. A computer hardware system comprising at least one processing unit coupled to a memory, wherein the memory is encoded with computer executable instructions that when executed cause the at least one processing unit to: identify a user associated with a user device using a connection engine; determine that a previously used authenticated connection is unavailable, wherein a previously used connection is a connection that has previously been used to fulfill a request provided by the user device enabling data associated with the previously fulfilled request to still be buffered and more readily available to fulfill the received request; remove a connection of a first type from a connection pool, the connection of the first type established between the connection engine and a resource, wherein the connection of a first type is an unauthenticated connection; authenticate the connection of the first type to provide a connection of a second type; and assign the connection of the second type to the user.

15. The system of claim 14, wherein the instructions that when executed cause the at least one processing unit to identify a user associated with a user device include instructions that when executed cause the at least one processing unit to:
authenticate the user.

16. The system of claim 14, wherein the connection of the second type is an authenticated connection.

17. The system of claim 16, wherein the connection of the first type is a first connection of the first type, and wherein the instructions further include instructions that when executed cause the processor to:
remove a second connection of the first type from the connection pool, the connection of the first type established between the connection engine and the resource.

18. The system of claim 14, wherein the instructions that when executed cause the at least one processing unit to identify a user associated with a user device include instructions that when executed cause the at least one processing unit to:
determine which of a plurality of resources the user may access.

* * * * *